(12) United States Patent
Belz et al.

(10) Patent No.: US 12,466,312 B2
(45) Date of Patent: Nov. 11, 2025

(54) METHOD FOR CONTROLLING THE LIGHTING OF A PASSENGER COMPARTMENT OF A MOTOR VEHICLE WITH A NUMBER OF LIGHTING DEVICES AND MOTOR VEHICLE

(71) Applicant: AUDI AG, Ingolstadt (DE)

(72) Inventors: Karsten Belz, Ingolstadt (DE); Patrick Lins, Ingolstadt (DE); Tarik Abousenna, Kösching (DE); Alexander Heinzelmann, Fürth (DE); Sven Michaelis, Munich (DE)

(73) Assignee: AUDI AG, Ingolstadt (DE)

( * ) Notice: Subject to any disclaimer, the term of this patent is extended or adjusted under 35 U.S.C. 154(b) by 54 days.

(21) Appl. No.: 18/347,127

(22) Filed: Jul. 5, 2023

(65) Prior Publication Data
US 2024/0010123 A1   Jan. 11, 2024

(30) Foreign Application Priority Data
Jul. 7, 2022 (DE) .................. 10 2022 116 941.3

(51) Int. Cl.
*B60Q 3/70* (2017.01)
*B60Q 3/225* (2017.01)
(Continued)

(52) U.S. Cl.
CPC ............. *B60Q 3/70* (2017.02); *B60Q 3/225* (2017.02); *B60Q 3/62* (2017.02); *B60Q 3/80* (2017.02)

(58) Field of Classification Search
CPC . B60Q 3/70; B60Q 3/225; B60Q 3/62; B60Q 3/80
See application file for complete search history.

(56) References Cited

U.S. PATENT DOCUMENTS 10,874,007 B2    12/2020  Wolfing et al.
2018/0111549 A1*  4/2018  Mathissen ............... B60Q 3/80
(Continued)

FOREIGN PATENT DOCUMENTS

DE    102013223145 A1    5/2015
DE    102016108754 A1    11/2017
(Continued)

*Primary Examiner* — Christopher E Dunay
(74) *Attorney, Agent, or Firm* — Sterne, Kessler, Goldstein & Fox P.L.L.C.

(57) ABSTRACT

The present disclosure relates to a method for controlling the illumination of an occupant compartment of a motor vehicle with multiple illumination devices, wherein a region of the occupant compartment assigned to the respective illumination device can in each case be illuminated by means of the illumination devices, wherein at least one light-specific parameter assigned to at least one of the regions or at least one item of illumination information from which the light-specific parameter is derived is specified by the user, wherein a variable characteristic of the light generated by the illumination device in the region depends on the respectively assigned light-specific parameter. The fulfillment of a change condition is checked by means of a comparison of at least one light-specific parameter assigned to one of the regions with at least one light-specific parameter assigned to another of the regions, wherein at least one of the light-specific parameters and/or at least one illumination device-specific parameter on which an emission characteristic of the light generated by means of an illumination device assigned to this illumination device-specific parameter depends is changed if the change condition is fulfilled.

15 Claims, 4 Drawing Sheets

(51) Int. Cl.
*B60Q 3/62* (2017.01)
*B60Q 3/80* (2017.01)

(56) References Cited

U.S. PATENT DOCUMENTS

| | | | | |
|---|---|---|---|---|
| 2019/0118653 | A1* | 4/2019 | Betz | B60K 35/29 |
| 2020/0114817 | A1* | 4/2020 | Fuhrmann | B60Q 3/80 |
| 2021/0307141 | A1* | 9/2021 | Huguet Ferran | H05B 47/11 |
| 2023/0373383 | A1* | 11/2023 | Schmidt | B60Q 1/547 |
| 2024/0010123 | A1* | 1/2024 | Belz | B60Q 3/62 |
| 2024/0017664 | A1* | 1/2024 | Thomas | B60Q 1/26 |

FOREIGN PATENT DOCUMENTS

| | | |
|---|---|---|
| DE | 102018005461 A1 | 1/2020 |
| DE | 102019210878 A1 | 1/2021 |

\* cited by examiner

METHOD FOR CONTROLLING THE LIGHTING OF A PASSENGER COMPARTMENT OF A MOTOR VEHICLE WITH A NUMBER OF LIGHTING DEVICES AND MOTOR VEHICLE

TECHNICAL FIELD

The present disclosure relates to a method for controlling the illumination of an occupant compartment of a motor vehicle with multiple illumination devices, wherein a region of the occupant compartment assigned to the respective illumination device can in each case be illuminated by means of the illumination devices, wherein at least one light-specific parameter assigned to at least one of the regions or at least one item of illumination information from which the light-specific parameter is derived is specified by the user, wherein a variable characteristic of the light generated by the illumination device in the region depends on the respectively assigned light-specific parameter.

BACKGROUND

For a long time, illumination devices in motor vehicles have no longer been used only for the mere illumination of the occupant compartment but have also been intended to make a contribution to the most pleasant ambiance in the occupant compartment. In this context, it is known from the prior art that light of different colors and/or brightnesses is generated in different regions in the occupant compartment of the motor vehicle. Such systems are known, for example, from DE 10 2013 223 145 A1, DE 10 2018 005 461 A1 or DE 10 2019 210 878 A1.

BRIEF DESCRIPTION OF DRAWINGS/FIGURES

Figure 1:
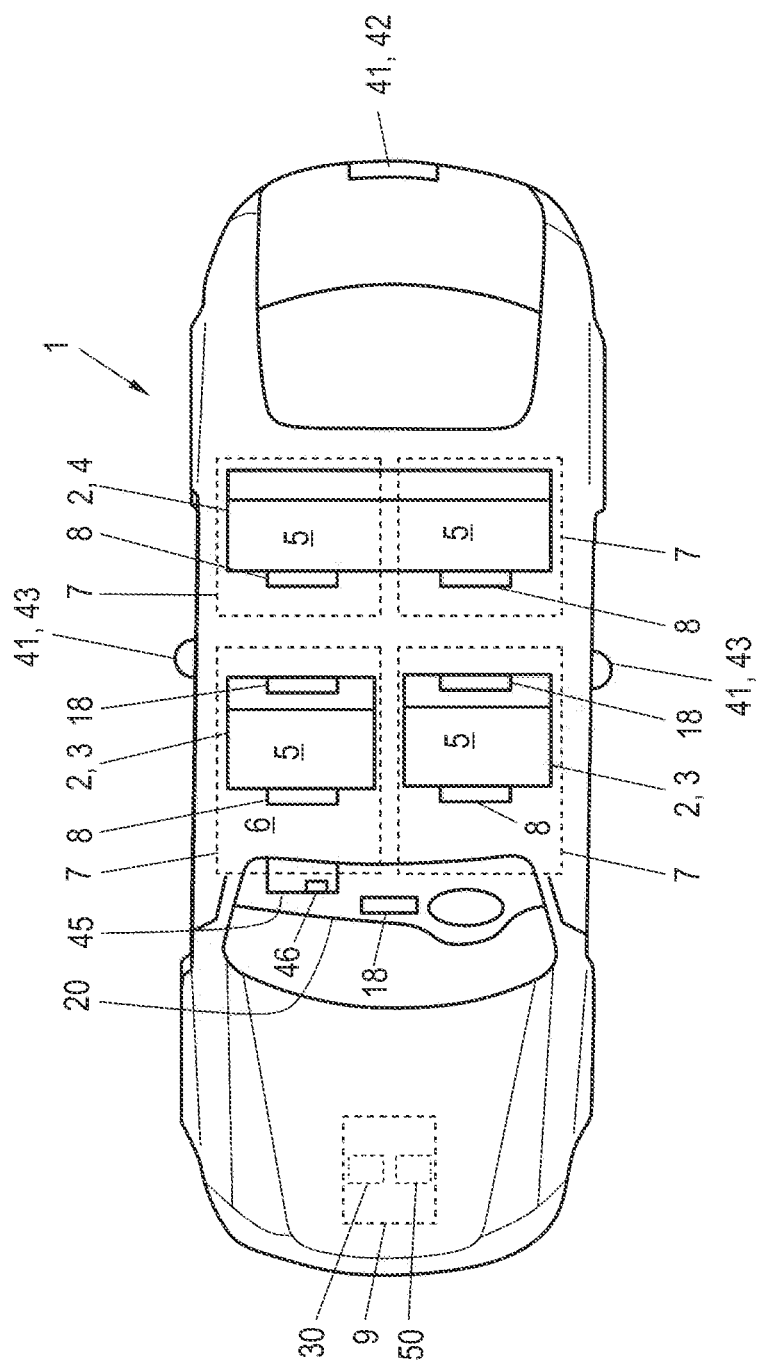
Figure 2:
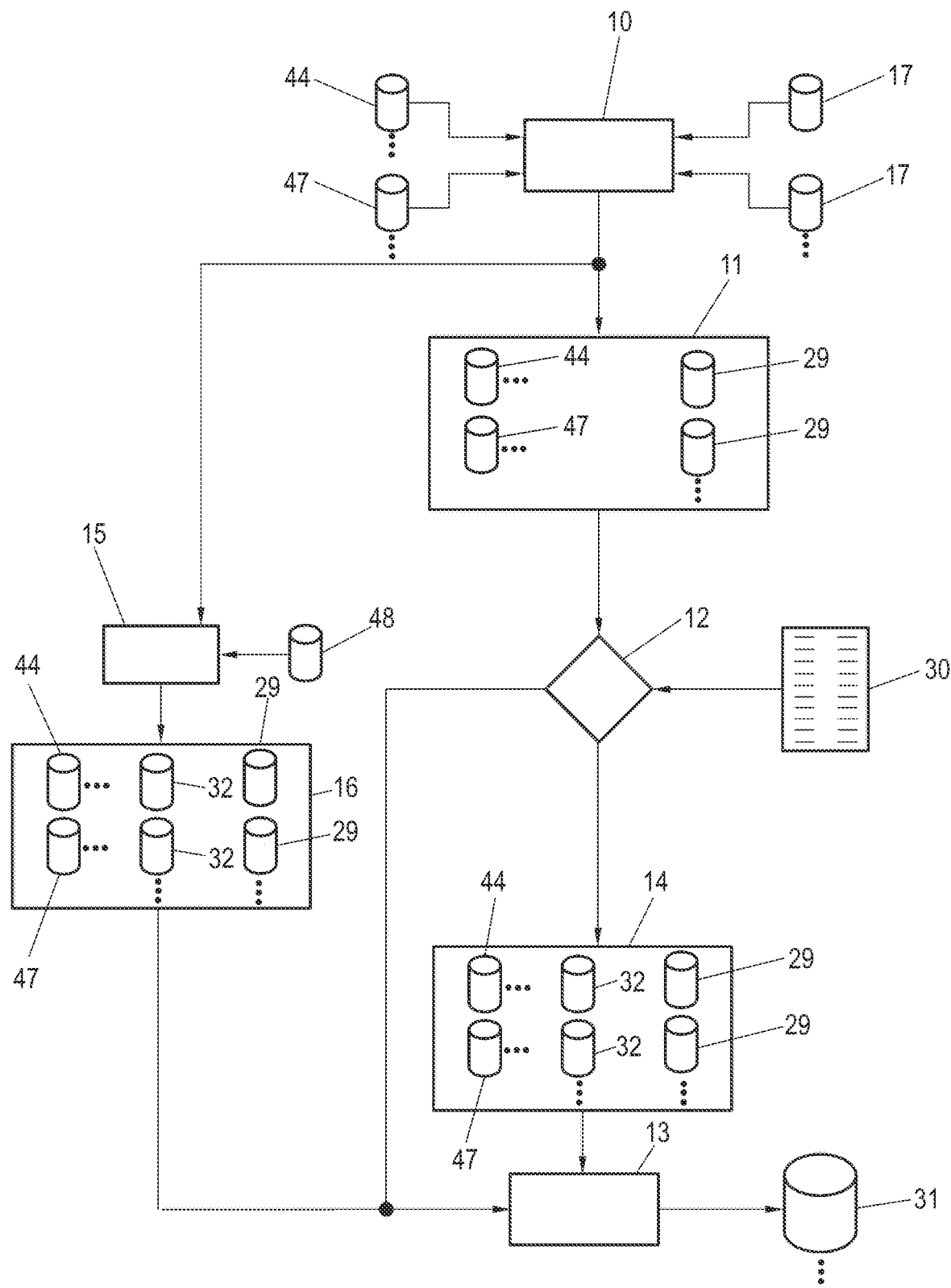
Figure 3:
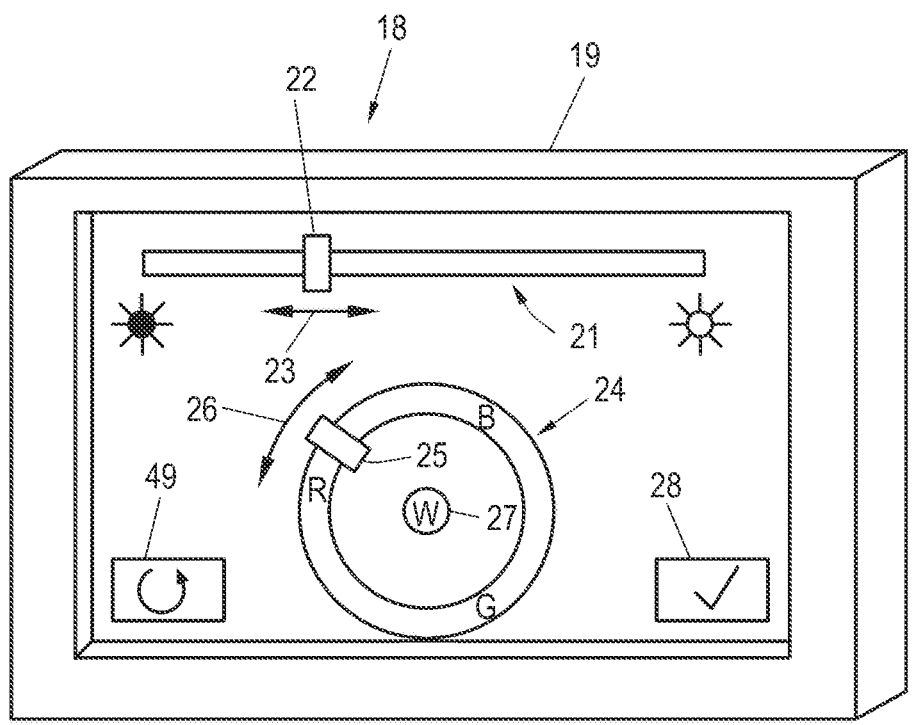
Figure 4:
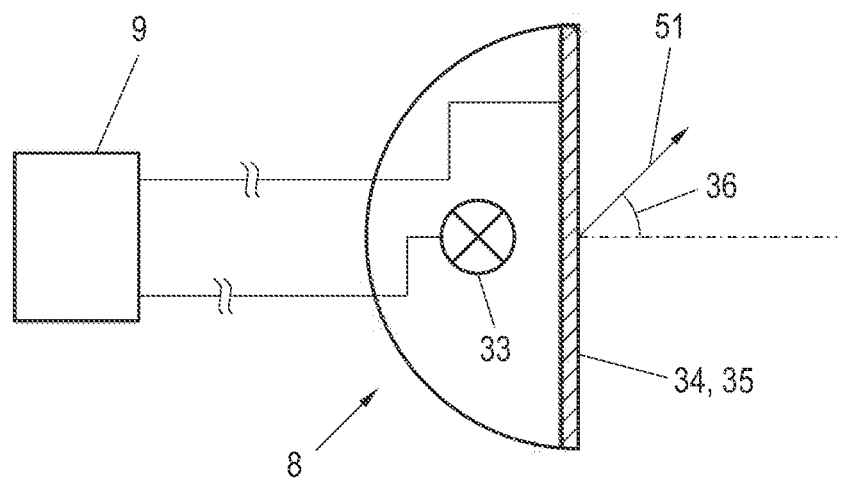
Figure 5:
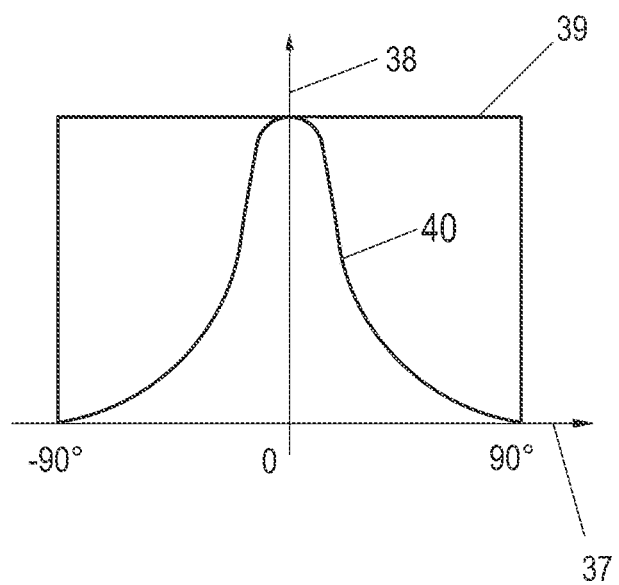

FIG. 1 shows an exemplary embodiment of the motor vehicle according to the present disclosure, FIG. 2 shows a flow chart relating to an exemplary embodiment of the method according to the present disclosure, which is explained with reference to the motor vehicle of FIG. 1, FIG. 3 shows a detail view of an operating device of the motor vehicle of FIG. 1, FIG. 4 shows a detailed view of an illumination device of the motor vehicle of FIG. 1, and FIG. 5 shows an angle-dependent dependence of the transparency of a glazing of the illumination device of FIG. 4.

DETAILED DESCRIPTION

The object of the present disclosure is to specify an improved concept with regard to differently illuminated regions of the occupant compartment of the motor vehicle.

According to the present disclosure, the object is achieved in a method of the type mentioned at the beginning in that the fulfillment of a change condition is checked by means of a comparison of at least one light-specific parameter assigned to one of the regions with at least one light-specific parameter assigned to another of the regions, wherein at least one of the light-specific parameters and/or at least one illumination device-specific parameter on which an emission characteristic of the light generated by means of an illumination device assigned to this illumination device-specific parameter depends is changed if the change condition is fulfilled.

According to the present disclosure, it is provided that the light illuminating the different regions has different characteristics, e.g., different physical properties, such as colors and/or brightnesses. It is provided that the light generated in the occupant compartment by means of the illumination devices can differ from region to region. In each of the regions, an individual illumination ambiance can thereby be generated.

The regions are each partial regions of the occupant compartment. Each of the regions is assigned at least one illumination device, wherein the respective illumination device or the respective illumination devices are arranged in particular in or on the respectively assigned region. Thus, the light generated by the illumination device primarily illuminates the respectively assigned region at least partially. In principle, it is conceivable that the regions overlap. The regions are not necessarily sharply delimited from one another or disjoint.

The characteristic of the light generated by the respective illumination device depends on the light-specific parameter, which is or comprises a numerical value, for example. The light-specific parameter may describe or may be a variable operating parameter of the illumination device, e.g., an operating voltage.

The light-specific parameter is generated in particular on the basis of the illumination information, which is present, for example, as a user-specified operating signal. This makes it possible for the user to be able to select or set an understandable item of information instead of having to directly specify the typically not readily understandable light-specific parameter. It is conceivable that for generating the illumination information, the user brings at least one slide control into a desired position and/or selects a numerical value, e.g., between 0 and 100, as illumination information. In this embodiment, the user consequently specifies the light-specific parameter indirectly, namely, via the specification of the illumination information.

As part of the method according to the present disclosure, it may happen that the user specifies the light-specific parameter not for all but only for at least one of the regions. For the remaining regions, the light-specific parameter can be automatically specified by the motor vehicle and in particular in accordance with a preset, e.g., a fixed preset. For the case in which the light-specific parameter for one of the regions is not specified by the user, it is conceivable that the respective region is not illuminated or the respectively assigned illumination device is switched off.

The user can specify the light-specific parameter during different operating situations of the motor vehicle, e.g., at the beginning or during a journey. The time of specification of the light-specific parameter can thus be at the user's discretion.

It is essential for the present disclosure that, if light-specific parameters are specified for different regions, the fulfillment of the change condition is checked on the basis of the light-specific parameters. As part of this check, light-specific parameters assigned to different regions are compared, in particular in pairs. Details with regard to any specific criteria on which the fulfillment of the change condition depends are given later in the context of the optional embodiments of the present disclosure.

If the change condition is fulfilled, one of the light-specific parameters and/or one of the illumination device-specific parameters is changed, preferably automatically, according to the present disclosure. If the change condition is fulfilled, a change in the illumination ambiance in the respectively assigned region therefore takes place.

With respect to the illumination device-specific parameter, it is provided that the emission characteristic of the light generated or emitted by means of the assigned illumination device depends on it. The emission characteristic relates to at least one variable operating parameter of the respective illumination device on which the manner of the emission of the light, e.g., geometric parameters, such as an emission angle and/or an emission direction, depends.

The present disclosure is based in particular on the idea that by means of the comparison, it is ascertained whether an overall appearance of the region-specific and possibly different illuminations needs to be changed or improved, wherein the change of the light-specific parameter and/or of the illumination device-specific parameter is carried out in order to achieve this goal. This is the case, for example, if the different illuminations in the regions result in a dissonant overall illumination ambiance in the occupant compartment. Corresponding dissonances can thus lead to irritation and/or discomfort and/or decreasing concentration on the part of the occupant(s). This is problematic in particular if multiple differently illuminated regions are in the field of vision of the user or occupant and the latter simultaneously visually perceives the different illuminations. The adjustment of the light-specific and/or illumination device-specific parameter results in a reduction or ideally in an elimination of this dissonance. This can take place, for example, by changing one, several or all parameters.

According to the present disclosure, it may be provided that a color of the light generated by the illumination device depends on the light-specific parameter assigned to this illumination device. Light of different colors can thus be generated via the illumination devices. The light-specific parameter may be or may depend on an RGB value that defines the color of the light. Thus, the light-specific parameter can be a triple of numbers, wherein the first number indicates the red value, the second number indicates the green value, and the third number indicates the blue value, each in the range between 0 and 255, for example. The light-specific parameter may be or may describe the wavelength of the light, in particular in angstrom.

Additionally or alternatively, it may be provided that a brightness of the light generated by the illumination device depends on the light-specific parameter assigned to this illumination device. Thus, light of different brightnesses can be generated, or the light can be dimmed, via the illumination devices. The light-specific parameter may be or may relate to the radiation intensity, e.g., in lumen or candela, of the light generated by means of the respective illumination device. It is conceivable that in this case, the light-specific parameter and/or the illumination information is a number between 0 and 100, wherein 0 describes the case in which the illumination device is switched off, and wherein 100 describes the case in which light of the maximum generable brightness is generated by means of the illumination device.

With respect to the change condition, it may be provided that it is fulfilled if the comparison reveals that light of different characteristics is generated in at least two of the regions in accordance with the light-specific parameters and that these characteristics correspond to a specified characteristic combination. It is preferably checked whether the light-specific parameters correspond to a specified parameter combination. The specified parameter or characteristic combinations represent a black list of combinations, in the presence of which a change in the light-specific and/or illumination device-specific parameter is carried out.

It is conceivable that the characteristic combination is fixedly specified. In this embodiment, the black list contains predefined characteristic or parameter combinations, e.g., color or brightness combinations, in the case of which the adjustment of the light-specific and/or illumination device-specific parameter is carried out. It is conceivable that the characteristic combinations are stored in a lookup table, which is stored, for example, by a control device of the motor vehicle.

Additionally or alternatively, the characteristic combination may be specified by the user. In this embodiment, the user can individually specify characteristic or parameter combinations perceived as disadvantageous. It is conceivable that the lookup table is expanded via user specifications. It is also conceivable that the user removes specified combinations from the lookup table. The user specifications may take place via an operating device of the motor vehicle.

Additionally or alternatively, the characteristic combination may be ascertained by means of artificial intelligence. This can be performed by the or a control device of the motor vehicle. Thus, a so-called deep learning engine may be provided, i.e., a technical device with a neural network. Compared to characteristic combinations specified fixedly or by the user, the artificial intelligence has the advantage, that not obvious but nevertheless existing dependencies for generating the characteristic combination are used. In particular, user specifications with regard to the preferences of the user may also be taken into account. In particular if a very extensive database is present in this respect, data evaluation based on artificial intelligence, e.g., for realizing a so-called data mining process, can be extremely effective.

The artificial intelligence can be trained by means of suitable training data records prior to the use in the motor vehicle. These data records may comprise user specifications which have been detected over a longer period of time and on the basis of which the artificial intelligence generates characteristic combinations. These results are compared with actual user preferences and checked with respect to their consistency so that a continuous learning process of the artificial intelligence takes place. It is also conceivable that the artificial intelligence is trained further during the actual use, namely, on the basis of the inputs made by the user. This has the advantage that the evaluation of the user specifications takes place specifically for the user(s) of the motor vehicle and provides better and better results.

If the color of the light generated by the illumination device depends on the light-specific parameter assigned to this illumination device, it is conceivable that the colors correspond to a specified color combination if they differ from one another with respect to their wavelengths by at least one specified wavelength limit value and/or are not mutually complementary colors. In this embodiment, the specified characteristic combination is the specified color combination. In this embodiment, a difference between the wavelengths of the light in different regions is determined, wherein the change condition is fulfilled if this difference is greater than the specified, in particular fixedly specified, wavelength limit value. It is thus conceivable that monochromatic light can be generated by means of the illumination devices, wherein the difference between the wavelengths can be determined by a corresponding subtraction of the respective wavelengths. If light of a continuous spectrum is generated by means of the illumination devices, it is conceivable that the wavelength difference is the difference between the central wavelengths of the respective light. The central wavelength may be defined as the spectral centroid or a median of the wavelengths of the light.

If the brightness of the light generated by the illumination device depends on the light-specific parameter assigned to this illumination device, it is conceivable that the brightnesses correspond to a specified brightness combination if they differ from one another with respect to their light intensities by at least one specified light intensity limit value. In this embodiment, the specified characteristic combination is the specified brightness combination. In this embodiment, a difference between the light intensities of the light in different regions is determined, wherein the change condition is fulfilled if this difference is greater than the specified, in particular fixedly specified, light intensity limit value.

Consequently, a change of the light-specific and/or illumination device-specific parameter occurs if the different colors and/or brightnesses differ too much from one another. An exception can be present if the light in the different regions has mutually complementary colors, e.g., blue/yellow or red/cyan or green/magenta. Thus, such color combinations are typically perceived as pleasant and are not detrimental to the overall illumination ambiance.

It is conceivable that if the change condition is fulfilled, at least one of the light-specific parameters is changed in such a way that light of the same characteristics is generated in the regions and/or the characteristics deviate from the or a specified characteristic combination. In this embodiment, the characteristics are harmonized, in particular in such a way that they are identical in the different regions or at least no longer deviate as much from one another as before the change. However, harmonizing may also only take place to the extent that the new characteristic combination is no longer contained in the black list. In this embodiment too, it is conceivable that the change to be carried out is determined by the or an artificial intelligence.

It is conceivable that the illumination device has at least one emission element which influences an emission direction or an emission angle range of the light generated by this illumination device, wherein the illumination device-specific parameter is or relates to the emission direction or the emission angle. If the change condition is fulfilled, the illumination device-specific parameter can be changed in such a way that the light generated by the respective illumination device is not visible or visible at a reduced brightness from at least one of the other regions. This also makes it possible to reduce or avoid corresponding dissonances in the overall illumination ambiance.

The emission element may be or may comprise a glazing, in particular a glass pane, below or behind which a light source of the illumination device is arranged, wherein an emission angle-dependent transparency of the glazing is changed as a function of the illumination device-specific parameter. In the glazing, which may also be referred to as angle-dependent or electrochromic glass, the light is differently bright as a function of the respective viewing angle to the illumination device. Thus, the light can be emitted at a maximum brightness in the region assigned to the respective illumination device and can be emitted at a reduced brightness, e.g., reduced to 0, in the direction of the usual regions. The angle-dependent transparency of the glazing can be set via a control voltage applied to the emission element.

The light source may be or may comprise at least one light-emitting diode. Thus, the illumination device can preferably be provided as a light-emitting diode band. The illumination device may in particular be arranged in a foot space of the motor vehicle, on a dashboard or an interior trim part, in particular a door trim part, or a seating device, in particular a vehicle seat or a seat bench.

In one conceivable embodiment of the method according to the present disclosure, it is provided that the motor vehicle has at least one exterior illumination device by means of which surroundings of the motor vehicle can be illuminated and/or a light signal visible from the surroundings of the motor vehicle can be generated. The exterior illumination device may be a communication lamp arranged, e.g., on the rear of the motor vehicle, and/or an entrance and exit lamp arranged, e.g., laterally on the motor vehicle.

In addition, it may be provided that an exterior illumination device-specific parameter or an item of exterior illumination information from which the exterior illumination device-specific parameter is derived is specified by the user and/or by the motor vehicle, wherein a variable characteristic of the light generated by this exterior illumination device depends on the exterior illumination device-specific parameter, wherein the fulfillment of the change condition additionally depends on the exterior illumination device-specific parameter. In this embodiment, not only the illuminations of the regions but also the illumination provided outside the motor vehicle are taken into account for checking the fulfillment of the change condition. Thus, in this embodiment, the overall illumination ambiance, which is in particular perceivable from outside the motor vehicle, is taken into account, wherein in the case of corresponding dissonances, a change in the light-specific and/or the illumination device-specific parameter and/or the exterior illumination device-specific parameter is carried out. An adjustment of parameter-related, safety-relevant exterior illuminations, e.g., of a front or rear headlight, a brake light or a turn signal, is in this case preferably not carried out or is carried out only to the extent that the change takes place in accordance with statutory requirements.

According to the present disclosure, it may be provided that the motor vehicle has at least one storage compartment illumination device by means of which a storage compartment of the motor vehicle can be illuminated. The storage compartment may be a glove compartment which can be closed by means of a flap and is arranged, for example, on or in a dashboard of the motor vehicle. The storage compartment illumination device can be actuated to generate light when a flap of the glove compartment is being opened, which can be detected by sensors.

In addition, it may be provided that a storage compartment illumination device-specific parameter assigned to the storage compartment illumination device is specified by the user and/or by the motor vehicle, wherein a variable characteristic of the light generated by this storage compartment illumination device depends on the storage compartment illumination device-specific parameter, wherein the fulfillment of the change condition additionally depends on the storage compartment illumination device-specific parameter. In this embodiment, not only the illuminations of the regions, and possibly the exterior illuminations of the motor vehicle, but also the illumination of the storage compartment are taken into account for checking the fulfillment of the change condition. Thus, in the case of corresponding dissonances, a change in the light-specific and/or the illumination device-specific and/or the exterior illumination device-specific parameter and/or the storage compartment device-specific parameter can be carried out.

According to present disclosure, it may be provided that, in the presence of an adjustment signal generated by the user, irrespective of the fulfillment of the change condition, at least one of the light-specific parameters and/or of the illumination device-specific parameters is changed in such a way that the characteristics of the light generated in the regions are identical and/or correspond to specified characteristics. The generation of the adjustment signal realizes a reset function with regard to the illumination in the regions and possibly with regard to the exterior illumination and/or the storage compartment illumination. Thus, in the generation of the adjustment signal, the illumination can take place in accordance with specified, in particular fixedly specified, parameters, wherein the illumination in the different regions is identical or at least adjusted to one another in this case. The generation of the adjustment signal by the user can be carried out via the or an operating device of the motor vehicle.

The present disclosure furthermore relates to a motor vehicle comprising multiple illumination devices, wherein a region of the occupant compartment of the motor vehicle assigned to the respective illumination device can in each case be illuminated by means of the illumination devices, wherein at least one light-specific parameter assigned to at least one of the regions or at least one item of illumination information from which the light-specific parameter can be derived can be specified by the user, wherein a variable characteristic of the light generated by the illumination device in the region depends on the respectively assigned light-specific parameter. The motor vehicle according to the present disclosure is characterized by a control device configured to carry out the method in accordance with the above description. The control device may be connected to the illumination devices and the or an operating device via electrical cabling. The motor vehicle according to the present disclosure may be designed and configured to carry out an autonomous driving operation. All advantages and features explained in connection with the method according to the present disclosure can be transferred to the motor vehicle according to the present disclosure, and vice versa.

The motor vehicle according to the present disclosure can comprise at least one operating device, in particular designed as a touchscreen, via which the light-specific parameter and/or the illumination information can be specified by the user. The operating device may be arranged in the region of a dashboard or on the rear side of a driver seat and/or passenger seat of the motor vehicle. In particular, an operating device may be provided for each of the regions.

An operating menu via which the corresponding operating actions can be carried out by the user can be displayed via the operating device. In order to specify the illumination information relating to the color, a chromatic circle can thus be displayed on a display of the operating device or of the touchscreen, wherein a slider movable along the chromatic circle can be moved into a corresponding position in order to specify the illumination information. A linear slide control can be displayed with respect to the illumination information relating to the brightness.

Each of the regions is preferably a partial region of the occupant compartment, in which a seating device or a seat of the motor vehicle is arranged in each case. A vehicle seat, e.g., a driver seat and a passenger seat, and/or a seat bench or rear bench of the motor vehicle may be provided as a seating device. Thus, both the driver seat and the passenger seat can each form a seat of the motor vehicle. The rear bench or multiple rear benches can define multiple, in particular three, seats.

FIG. 1 shows a motor vehicle 1 according to the present disclosure in accordance with an exemplary embodiment of the present disclosure. The motor vehicle 1 comprises multiple seating devices 2, namely, a vehicle seat 3 designed as a driver seat and a vehicle seat 3 designed as a passenger seat, and a seat bench 4 designed as a rear bench. Each of the vehicle seats 3 forms a seat 5. The seat bench 4 forms two seats 5, wherein a further seat may be provided in the center of the seat bench 4.

An occupant compartment 6 of the motor vehicle 1 comprises multiple regions 7, each of which is assigned an illumination device 8. Each of the regions 7 is assigned to, or comprises, one of the seats 5. By way of example, the illumination devices 8 are each arranged in the foot space. However, the illumination devices 8 may also be provided on a vehicle interior trim, such as the door trim and/or a dashboard 20 and/or the seating device 2.

FIG. 2 shows a flow chart for illustrating the method according to the present disclosure in accordance with an exemplary embodiment, which is explained with reference to the motor vehicle 1 of FIG. 1. In order to carry out the method, a control device 9 of the motor vehicle 1 is provided, which is connected via cabling (not shown in detail in FIG. 1) to the components of the motor vehicle 1 that are involved in the method. The method comprises steps 10 to 16.

In the first step 10 of the method, items of illumination information 17 specified by the user are recorded. The items of illumination information 17 are each assigned to one of the regions 7. In order to specify the illumination information 17, operating devices 18 are provided, which in the present case are designed as a touch screen 19 respectively assigned to at least one of the regions 7. Thus, one of the touchscreens 19 is arranged on a dashboard 20 of the motor vehicle 1, wherein the items of illumination information 17 on the two front regions 7 relating to the vehicle seats 3 can be specified via this touchscreen 19. In addition, a further operating device 18 is in each case provided on the rear side of the vehicle seats 3 and the illumination information 17 of the rear regions 7 relating to the seat bench 4 can be specified via it.

Details with respect to the specification of the illumination information 17 are explained below with reference to FIG. 3, which shows a detailed representation of the operating device 18, or the touchscreen 19. Thus, a first slide control 21 is displayed on a display of the touchscreen 19 and the illumination information 17 relating to a brightness desired by the user in the respective region 7 can be specified via it. A first slider 22 of the first slide control 21 can be moved, which is indicated by the double arrow 23. The outermost left position of the first slider 22 corresponds to the illumination information 17 that the brightness generated by means of the respective illumination device 8 is 0 or the illumination device 8 in this region 7 is switched off. The outer right position of the first slider 22 corresponds to the illumination information 17 that the assigned illumination device 8 generates light of a maximum possible brightness with respect to this illumination device 8.

Furthermore, a second slide control 24 representing a chromatic circle is shown on the display of the operating device 18 and a second slider 25 can be moved along it into a desired position, indicated by the arrow 26. The chromatic circle covers the entire color spectrum, wherein the primary colors red, blue and green are indicated symbolically in FIG. 3 by the letters R, B, G. By means of the illumination information 17 relating to the color desired by the user, the user can select the color of the light generated in the respective region 7 by means of the respective illumination device 8. If the user prefers not colored but white light, the user can specify the corresponding illumination information 17 by tapping a button 27 which is arranged centrally in the second slide control 24 and on which the letter W, which stands for the color white, is displayed. As soon as the user has brought the sliders 22, 25 into the desired position or has brought the first slider 22 into the desired position and has tapped the button 27, the user can confirm their selection by tapping a button 28 representing an actuating button, wherein in this case, the corresponding items of illumination information 17 are generated and transmitted to the control device 9.

The generation of the items of illumination information 17 or of at least one new, additional item of illumination information 17 or a change of a previously specified item of illumination information 17 is in principle conceivable at any time, in particular at the beginning or during a journey of the motor vehicle 1, which is an autonomously driving motor vehicle by way of example. While the method according to the present disclosure is being carried out, the method is automatically started again in the first step 10 in the case of the specification of new items of illumination information 17 or in the case of the change in previously specified items of illumination information 17. Since a total of four regions 7 are present and two items of illumination information 17 can be specified per region 7, namely, relating to the color and the brightness, a maximum of eight items of illumination information 17 can be present in total.

The operating device 18 shown in FIG. 3 is assigned to one of the rear regions 7. In particular with respect to the operating device 18 arranged on the dashboard 20 and assigned to the front regions 7, it is conceivable that multiple first and second slide controls 21, 24 are displayed so that a driver can specify the items of illumination information 17 for all regions 7 of the occupant compartment 6. In addition to the user specification of the items of illumination information 17, the latter may also be specified by the motor vehicle, e.g., by means of artificial intelligence 50 implemented in the control device 9.

In the second step 11 of the method, light-specific parameters 29 are derived or ascertained from the items of illumination information 17. Specifically and by way of example, a numerical value between 0 and 100 is generated on the basis of the position of the first slider 22, wherein 0 indicates a switched-off illumination device 8 and 100 indicates light of maximum brightness being generated by the respective illumination device 8. On the basis of the position of the second slider 45 on the chromatic circle 24 or on the basis of the actuation of the button 27, an RGB value, i.e., a triple of numbers, describing the respectively desired color is generated. The light-specific parameters 29 therefore describe variable characteristics of the light generated by the respective illumination device 8 in the respective region 7, wherein one of the characteristics relates to a color and another of the characteristics relates to a brightness of the light. These two characteristics provided in this exemplary embodiment are not conclusive, which is indicated in FIG. 2 by the three continuation dots in the items of illumination information 17 and the light-specific parameters 29.

In the next step 12 of the method, the fulfillment of a change condition is checked, wherein a comparison of the light-specific parameters 29 relating to different regions 7 is carried out for this purpose. The comparison is carried out in pairs, for example, so that two of the light-specific parameters 29 are compared in each case. Specifically, the light-specific parameters 29 relating to the color and the light-specific parameters 29 relating to the brightness are in each case compared with one another so that a total of twelve comparisons take place in the case of eight specified light-specific parameters 29.

The light-specific parameters 29 relating to the colors are compared as to whether the light colors to be correspondingly generated correspond to a specified color combination. There are several possibilities for the specific implementation of this comparison. Thus, the colors of the specified color combinations may correspond if they deviate from one another with respect to their wavelengths by at least one specified, in particular fixedly specified, wavelength limit value, i.e., if the colors deviate from one another by a minimum dimension defined by the wavelength limit value. In the case of light of a continuous spectrum, the wavelengths relate in particular to the respective central wavelength. If the colors differ from one another by the wavelength limit value, a check optionally subsequently takes place as to whether the colors are complementary to one another, wherein the change condition is not fulfilled in this case since complementary colors typically harmonize well with one another.

The light-specific parameters 29 relating to the brightnesses are compared as to whether the brightnesses correspond to a specified brightness combination. This is the case, for example, if the brightnesses differ from one another with respect to their light intensities by a specified, in particular fixedly specified, light intensity limit value. The brightnesses therefore correspond to the brightness combination if the brightnesses generated in different regions 7 differ too much from one another.

The characteristic combinations, i.e., the color and brightness combinations, can in principle be fixedly specified. In the present exemplary embodiment, however, it is provided that the characteristic combinations, which are stored in a lookup table 30 by the control device 9, are dynamic, or variable. Thus, it is possible for the user to specify new characteristic combinations, in particular via the operating device 18, and to expand the lookup table accordingly. Thus, the user can specifically add accordingly characteristic combinations perceived as disadvantageous if they are not already stored in the lookup table 30 anyway. The user can also remove from the lookup table 30 characteristic combinations specified thereby. Additionally or alternatively, the characteristic combinations may also be specified by means of artificial intelligence 50.

In summary, the change condition is fulfilled if the light in at least two different regions 7 corresponds to one of the specified characteristic combinations, i.e., color or brightness combinations, since a disadvantageous overall illumination ambiance would be present in this case in the occupant compartment 6 due to these differences of the light. This may be the case if the light in different regions 7 has a major brightness difference and/or different colors that do not harmonize well with one another. The specified characteristic combinations effectively represent a black list that includes "impermissible" color and/or brightness combinations.

If the check of the fulfillment of the change condition in step 12 reveals that the change condition is not fulfilled, the method is continued in the next step 13. In step 13, control signals 31 are generated on the basis of the light-specific parameters 29 and are used to actuate the illumination devices 8 in such a way that light according to the specified items of illumination information 17, or light-specific parameters 29, is generated in the regions 7.

If the check of the change condition in step 12 reveals that the change condition is fulfilled, the method is continued in the next step 14. In step 14, at least one of the light-specific parameters 29 is changed. This change takes place in such a way that light of the same characteristics, or colors/brightnesses, is generated in the regions 7. It is also conceivable that the characteristics specified according to the specified light-specific parameters 29 are changed in such a way that they no longer correspond to one of the specified characteristic combinations. Specifically, it may be provided with respect to the brightnesses that the brightness in a brightly illuminated region 7 is reduced and the brightness in a not or only slightly illuminated region 7 is simultaneously increased, e.g., until the light intensities deviate from one another less than the specified light intensity limit value. With respect to the colors, it may be provided that they are adjusted to one another. Thus, if it is provided in accordance with the specified light-specific parameters 29 that a green light is generated in one of the region 7 and a blue light is generated in another of the region 7, turquoise light is generated in these regions 7 instead, or that blue light is generated instead in the region with green light, or vice versa. In this case, corresponding feedback may be given to the user, e.g., by automatically bringing the slides 22, 25 to the positions corresponding to the changed light-specific parameters 29.

Additionally or alternatively, at least one illumination device-specific parameter 32 on which an emission characteristic of the light generated by means of an illumination device 8 assigned to this parameter depends may be changed in step 14. Details in this respect are explained below with reference to FIG. 4, which shows a schematic view of the cross section of one of the illumination devices 8.

Thus, the illumination device 8 comprises a light source 33, in the present case multiple light-emitting diodes, one of which being shown in FIG. 4. The illumination device 8 is designed as a light-emitting diode band. The illumination device 8 furthermore comprises an emission direction or an emission angle range of the emission element 34 which influences the light generated by the illumination device 8 and which in the present case is a glazing 35, or a glass pane, below or behind which the light source 33 is arranged. With respect to the glazing 35, a transparency dependent on an emission angle 36 of the light can be changed, namely, via an electrical voltage which can be applied by the control device 9 to the glazing 35 and which depends on or is the illumination device-specific parameter 32. The light generated by means of the illumination device 8 is indicated in FIG. 4 by an arrow 51.

The dependence between the emission angle 36 and the transparency is shown in FIG. 5, wherein the x-axis 37 relates to the emission angle 36 and the y-axis 38 relates to the transparency. The rectangular curve 39 shows the dependence between the emission angle 36 and the transparency before the change of the illumination device-specific parameter 32, wherein the transparency of the glazing 35 is in this case ideally constant and at the maximum between −90° and 90° for all possible emission angles 36. After the change of the illumination device-specific parameter 32, this dependence corresponds to the bell curve 40 so that the transparency of the glazing 35 decreases with increasing magnitude of the emission angle 36. This causes the light generated by this illumination device 8 to be only attenuated or possibly no longer visible in the case of an oblique viewing angle to the illumination device 8. The emission angle range of this illumination device 8 is therefore reduced or narrowed in this case.

The just described change in the illumination device-specific parameter 32 is expedient, for example, if light of a different color or brighter light is generated in a front one of the regions 7 than in a region 7 arranged behind it, wherein the change in the transparency of the glazing 35 causes the light generated by means of the illumination device 8 assigned to the front region 7 to be attenuated or no longer visible from the view of the rear region 7.

After the change of the light-specific parameter 29 and/or the illumination device-specific parameter 32, the method is continued in step 13 for generating the control signals 31.

A further, optional aspect with respect to the method or motor vehicle 1 according to the present disclosure is explained below. Thus, the motor vehicle 1 comprises exterior illumination devices 41, namely, a communication lamp 42 which is arranged on the rear of the motor vehicle 1 and by means of which a light signal visible from the surroundings of the motor vehicle 1, in particular a colored symbol and/or text, can be generated, and entrance and exit lamps 43 which are arranged laterally on the motor vehicle 1 and by means of which the lateral surroundings of the motor vehicle 1 can be illuminated (see FIG. 1). In order to operate the exterior illumination devices 41, at least one exterior illumination device-specific parameter 44 assigned to one of the exterior illumination devices 41 can be specified by the user or by the motor vehicle, wherein a variable characteristic, in particular the color and/or brightness, of the light generated by means of the corresponding exterior illumination device 41 depends on the exterior illumination device-specific parameter 44. The generation and detection of the exterior illumination device-specific parameter 44 can take place at any time, like those of the light-specific parameters 29, wherein the method is restarted in step 10 when the parameter 44 is detected. In this case, in step 12 of the method, the exterior illumination device-specific parameter 44 is then taken into account in the check of the fulfillment of the change condition. Specifically, it may be provided that a check takes place as to whether the light colors generated by means of the illumination devices 8 and the exterior illumination devices 41 correspond to the specified color combinations, and in this case a corresponding change of the light-specific parameters 29 and/or of the illumination device-specific parameters 32 and/or of the exterior illumination device-specific parameters 44 is carried out in step 14 in this case.

A further optional aspect in the present exemplary embodiment of the motor vehicle or method according to the present disclosure is explained below. Thus, the motor vehicle 1 comprises a storage compartment 45 arranged in the dashboard 20, namely, a glove compartment which can be illuminated by means of a storage compartment illumination device 46. A storage compartment illumination device-specific parameter 47 assigned to the storage compartment illumination device 46 is specified by the user or by the motor vehicle, wherein a variable characteristic, in particular color and/or brightness, of the light generated by the storage compartment illumination device 46 depends on the storage compartment illumination device-specific parameter 47. In the case of the detection of the storage compartment illumination device-specific parameter 47, the method is likewise restarted in the first step 10. As part of the check of the change condition in step 12, the storage compartment illumination device-specific parameter 47 is also taken into account. Thus, the change condition would be fulfilled if the storage compartment illumination device-specific parameter 47 were to cause a strong illumination of the storage compartment 46 and, in accordance with the light-specific parameters 29, the brightness in the regions 7 were significantly lower. As part of step 14, the parameters 29, 32, 44, 47 can then be adjusted or changed accordingly. For example, in the case just mentioned, the brightness of the light generated by the storage compartment illumination device 46 can be reduced.

In parallel with method steps 10 to 14, method step 15 is carried out. The latter relates to the check as to whether an adjustment signal 48 generated by the user is present, which can be generated, for example, by pressing a reset button 49, which is shown on the display of the touchscreen 19. If the presence of the adjustment signal 48 has been detected as part of step 15, a change in the parameters 29, 32, and in particular the parameters 44, 47, is carried out in the subsequent step 16 in such a way that the characteristics of the light generated in the regions 7 are identical or correspond to specified, in particular fixedly specified, characteristics. After the adjustment, the method is continued in step 13, in which the control signals 31 are generated on the basis of the adjusted parameters 29, 32, 44, 47. The actuation of the reset button 49 therefore causes the illumination situation to be reset to preset values.

The invention claimed is:

1. A method for controlling illumination of an occupant compartment of a motor vehicle with a plurality of illumination devices, the method comprising:
   illuminating a region of a plurality of regions of the occupant compartment by an illumination device of the plurality of illumination devices, wherein the region is assigned to the illumination device;
   assigning, to the region, at least one light-specific parameter or at least one item of illumination information from which the at least one light-specific parameter is derived, based on a user specification, wherein a variable characteristic of light that is generated in the region is based on the at least one light-specific parameter assigned to the region;
   checking fulfillment of a change condition by comparing the at least one light-specific parameter assigned to the region with at least one light-specific parameter assigned to another region; and
   if the change condition is fulfilled, changing the at least one light-specific parameter assigned to the region or at least one illumination device-specific parameter from which an emission characteristic of the light depends.

2. The method of claim 1, further comprising generating by the illumination device, a color or brightness of the light based on the at least one light-specific parameter assigned to the region.

3. The method of claim 2, further comprising:
   determining that the color corresponds to a specified color combination, if at least one of the following is true:
      one or more colors differ from one another with respect to their wavelengths by at least one specified wavelength limit, or
      the one or more colors are not mutually complementary colors, or
   determining that the color corresponds to a specified brightness combination if the brightness differs from one another with respect to their light intensities by at least one specified light intensity limit value.

4. The method of claim 1, further comprising determining that the change condition is fulfilled based on a determination that light of different characteristics is generated in at least two regions of the plurality of regions in accordance with the light-specific parameter assigned to the at least two regions, wherein the different characteristics correspond to a specified characteristic combination of a plurality of characteristic combinations.

5. The method of claim 4, further comprising specifying the specified characteristic combination of the plurality of characteristic combinations, wherein the plurality of characteristic combinations are specified by a user or specified using artificial intelligence.

6. The method of claim 5, wherein the specifying further includes specifying the specified characteristic combination of the plurality of characteristic combinations in a lookup table.

7. The method of claim 1, further comprising, in response to a fulfilled change condition, changing the at least one light-specific parameter to generate light with same characteristics in the plurality of regions or the characteristics to deviate from a specified characteristic combination in the plurality of regions.

8. The method of claim 1, further comprising influencing an emission direction or an emission angle range of the light generated by at least one emission element of the illumination device, by the at least one illumination device-specific parameter.

9. The method of claim 8, further comprising changing an emission angle-dependent transparency of a glazing as a function of the at least one illumination device-specific parameter, wherein the at least one emission element comprises the glazing, wherein a light source of the illumination device is arranged behind or beneath the glazing.

10. The method of claim 9, wherein the at least one emission element is a glass pane.

11. The method of claim 8, further comprising changing the at least one illumination device-specific parameter, in response to a fulfilled change condition, such that the light generated by the illumination device is not visible or visible at a reduced brightness from at least one other region of the plurality of regions.

12. The method of claim 1, further comprising:
   generating a light signal visible from a surroundings of the motor vehicle or illuminating the surroundings of the motor vehicle using at least one exterior illumination device;
   assigning an exterior illumination device-specific parameter or at least one item of exterior illumination information from which the exterior illumination device-specific parameter is derived, based on the user specification or a specification on a part of the motor vehicle, wherein the exterior illumination device-specific parameter is assigned to the at least one exterior illumination device; and
   deriving a variable characteristic of the light generated by the at least one exterior illumination device based on the exterior illumination device-specific parameter, wherein the fulfillment of the change condition additionally depends on the exterior illumination device-specific parameter.

13. The method of claim 1, further comprising:
   illuminating a storage compartment of the motor vehicle using at least one storage compartment illumination device;
   assigning a storage compartment illumination device-specific parameter based on the user specification or a specification on a part of the motor vehicle, wherein the storage compartment illumination device-specific parameter is assigned to the at least one storage compartment illumination device; and
   deriving a variable characteristic of the light by the at least one storage compartment illumination device based on the storage compartment illumination device-specific parameter, wherein the fulfillment of the change condition additionally depends on the storage compartment illumination device-specific parameter.

14. The method of claim 13, wherein the storage compartment is a glove compartment.

15. The method of claim 5, further comprising changing at least one of the at least one light-specific parameter and/or the at least one illumination device-specific parameter to generate the light in regions with identical characteristics and/or correspond to specified characteristics, in the presence of an adjustment signal generated by a user, irrespective of the fulfillment of the change condition.

* * * * *